(12) United States Patent
Burling (10) Patent No.: US 10,090,715 B2
(45) Date of Patent: Oct. 2, 2018

(54) SYSTEM AND METHOD FOR TRANSMITTING DATA OR POWER ACROSS A STRUCTURAL COMPONENT

(71) Applicant: The Welding Institute, Great Abington (GB)

(72) Inventor: Paul Burling, Great Abington (GB)

(73) Assignee: The Welding Institute, Great Abington, Cambridgeshire (GB)

( * ) Notice: Subject to any disclaimer, the term of this patent is extended or adjusted under 35 U.S.C. 154(b) by 100 days.

(21) Appl. No.: 15/113,130

(22) PCT Filed: Jan. 15, 2015

(86) PCT No.: PCT/GB2015/050076
§ 371 (c)(1),
(2) Date: Jul. 21, 2016

(87) PCT Pub. No.: WO2015/110793
PCT Pub. Date: Jul. 30, 2015

(65) Prior Publication Data
US 2017/0005529 A1   Jan. 5, 2017

(30) Foreign Application Priority Data

Jan. 21, 2014   (GB) .................................. 1401014.4

(51) Int. Cl.
*H01F 27/42*   (2006.01)
*H02J 50/20*   (2016.01)
(Continued)

(52) U.S. Cl.
CPC .............. *H02J 50/20* (2016.02); *H01P 3/165* (2013.01); *H01Q 13/26* (2013.01); *H02J 50/80* (2016.02)

(58) Field of Classification Search
CPC .......... H01P 3/165; H01Q 13/26; H02J 50/80; H02J 50/20
See application file for complete search history.

(56) References Cited

U.S. PATENT DOCUMENTS 7,307,589 B1 *   12/2007   Gregoire ................ H01Q 1/248
343/700 MS
7,931,858 B1 *   4/2011   Gross ........................ A61L 2/14
204/157.15

(Continued)

FOREIGN PATENT DOCUMENTS

EP          0309982  A2    4/1989
EP          2677669  A1   12/2013
(Continued)

OTHER PUBLICATIONS

"International Application Serial No. PCT/GB2015/050076, International Search Report dated Mar. 25, 2015", 4 pgs.
(Continued)

*Primary Examiner* — Jared Fureman
*Assistant Examiner* — Duc M Pham
(74) *Attorney, Agent, or Firm* — Schwegman Lundberg & Woessner, P.A.

(57) ABSTRACT

A system is disclosed for transmitting data and/or power across a structural component, comprising: a structural component, a first transducer and a second transducer. The structural component is formed of first and second layers which conform to one another, the first layer comprising a dielectric composite material having first and second surfaces, and the second layer comprising a conductive material contacting the first surface of the first layer, whereby the electrical reactance of the first layer is configured for the propagation of electromagnetic surface waves thereacross. The first transducer is on or adjacent the second surface of
(Continued)

the first layer of the structural component at a first location, the first transducer being adapted to generate electromagnetic surface waves for carrying data and/or power across the first layer. The second transducer is on or adjacent the second surface of the first layer of the structural component at a second location spaced from the first location, the second transducer being adapted to receive electromagnetic surface waves from the first layer and to retrieve data and/or power from the received electromagnetic surface waves. The electromagnetic surface waves are transmitted from the first transducer to the second transducer by the first layer of the structural component. The dielectric composite material forming the first layer comprises reinforcement elements disposed in a matrix, and the first layer has a bulk region in which both the reinforcement elements and the matrix are present and a first skin region comprising a greater proportion of matrix to reinforcement elements than in the bulk region, the first skin region forming the first surface of the first layer. A vehicle and a network each comprising the system are also provided, as is a method of its manufacture.

28 Claims, 3 Drawing Sheets

(51) Int. Cl.
   *H01Q 13/26* (2006.01)
   *H01P 3/16* (2006.01)
   *H02J 50/80* (2016.01)

(56) References Cited

U.S. PATENT DOCUMENTS

| | | | | |
|---|---|---|---|---|
| 2004/0232807 | A1* | 11/2004 | Pelrine | F04B 35/00 310/330 |
| 2008/0226878 | A1 | 9/2008 | Benslimane et al. | |
| 2013/0064311 | A1* | 3/2013 | Turner | H01P 3/00 375/259 |

FOREIGN PATENT DOCUMENTS

| | | |
|---|---|---|
| GB | 2494435 A | 3/2013 |
| JP | 2001-237617 A | 8/2001 |
| JP | 2003-049087 A | 2/2003 |
| JP | 2003-115707 A | 4/2003 |
| WO | WO-2006110162 A | 10/2006 |
| WO | WO-2007036705 A1 | 4/2007 |
| WO | WO-2013044618 A1 | 4/2013 |
| WO | WO-2015110793 | 7/2015 |

OTHER PUBLICATIONS

"International Application Serial No. PCT/GB2015/050076, Written Opinion dated Mar. 25, 2015", 6 pgs.

"United Kingdiom Aoplication Serial No. GB1500630.7, Combined Search and Examination Report dated May 6, 2015", 6 pgs.

"United Kingdom Application Serial No. GB1401014.4, Search Report dated Jun. 27, 2014", 4 pgs.

Elkjaer, Karl, et al., "Integrated Sensor Arrays based on PiezoPaintTM for SHM Applications", Annual Conference of the Prognostics and Health Management Society, 2013, (2013), 1-9.

Hendry, Janice, "Isolation of the Zenneck Surface Wave", 2010 Loughborough Antennas and Propagation Conference (LAPC), (2010), 4 pgs.

Hendry, Janice, et al., "Surface Waves: What Are They? Why are They Interesting?", [online]. [archived on Aug. 23, 2015]. Retrieved from the Internet: <URL: https://web.archive.org/web/20150823235910/http://www.armms.org/media/uploads/1259319847.pdf>, (2015), 1-10.

Kawahara, Yoshihiro, et al., "Instant Inkjet Circuits: Lab-based Inkjet Printing to Support Rapid Prototyping of UbiComp Devices", Proceedings of the 2013 ACM International Joint Conference on Pervasive and Ubiquitous Computing, UbiComp' 13, Sep. 8-12, 2013, Zurich, Switzerland, (2013), 10 pgs.

Turner, Janice E., et al., "A Novel Technique Enabling the Realisation of 60 GHz Body Area Networks", 2012 Ninth International Conference on Wearable and Implantable Body Sensor Networks, (2012), 58-62.

* cited by examiner

SYSTEM AND METHOD FOR TRANSMITTING DATA OR POWER ACROSS A STRUCTURAL COMPONENT

PRIORITY CLAIM TO RELATED APPLICATIONS

This application is a U.S. national stage application filed under 35 U.S.C. § 371 from International Application Serial No. PCT/GB2015/050076, which was filed 15 Jan. 2015, and published as WO2015/110793 on 30 Jul. 2015, and which claims priority to United Kingdom Application No. 1401014.4, filed 21 Jan. 2014, which applications and publication are incorporated by reference as if reproduced herein and made a part hereof in their entirety, and the benefit of priority of each of which is claimed herein.

This invention relates to media for transmitting and guiding electromagnetic waves carrying data or power, in particular surface waves, where the media takes the form of a structural component.

Certain frequencies of electromagnetic (EM) radiation can be used for the transmission of data (e.g. communication or control) signals and power. The propagation of EM radiation can be explained using wave theory. EM waves may propagate in a vacuum as well as in material media. Material media used to confine waves within particular bounds are known as waveguides and the geometry and material make-up of such control their function and usefulness. For EM waves, waveguides can be constructed from conductive or dielectric materials. Common types of waveguides include metal conductors such as copper and aluminium for power and communication lines, optical fibres for light transmission; the ear canal and loudspeakers for sound transmission and the earth's atmosphere which facilitates radio transmission as surface waves.

Surface waves are a particular type of wave that propagates along the interface between media with differing properties—they can be said to be surface-bound, rather than material (or air) bound. In the case of mechanical waves, this will be between materials of different densities, whilst with EM waves, this will be along a refractive index gradient, where refractive index is a dimensionless number that describes how radiation propagates through a medium.

US-A-2013/0064311 describes an apparatus for the transmission of electromagnetic (radio) surface waves, in particular it relates to transmission and reception of Zenneck waves through a suitable transmitting substrate comprising coupled layers of dielectric and conductive material. Transducers are placed at different points of the waveguide and used to transmit information, such as data and video signals or power. Exemplary implementations include: a clothing article made from the disclosed substrate, with coupled monitors and communication devices; furniture on which the disclosed substrate is carried so as to enable surface wave links between a computer or other such devices to a network; and a vehicle or building with entertainment systems linked via a surface wave channel provided by a length of the disclosed substrate carried by a suitable support such as a wall. The waveguides disclosed all take the form of laminated dielectric and conductive layers, e.g. taking the form of coupled sheets of uniform and matching material thickness, whether planar or corrugated. Particular examples include neoprene (polychloroprene synthetic rubber) or PTFE as the dielectric, and copper, aluminium or metallic paint as the conductor. Description of the theory, apparatus and operation behind surface wave transmission is provided in some detail in US2013/0064311 and is not reproduced in this account of the current invention. Further information relating to Zenneck waves can be found in several publications made by the first named inventor of US 2013/0064311, Janice Turner (formerly Hendry), including: "A Novel Technique Enabling the Realisation of 60 GHz Body Area Networks", 2012; "Isolation of the Zenneck Surface Wave", 2010; and "Surface Waves: What are they? Why are they Interesting?", 2009.

U.S. Pat. No. 7,307,589 describes an adaptive surface actuated in response to control signals received by antenna on the surface. The surface is composed of a dielectric with repeating patterns of electrically conductive structures which facilitate propagation of the control signals as surface waves. Example materials include Kapton (a polyimide film, poly-oxydiphenylene-pyromellitimide) with printed Jerusalem crosses or more complex structures. Kapton ages poorly and degrades.

In accordance with the present invention, a system for transmitting data and/or power across a structural component is provided, comprising:

a structural component formed of first and second layers which conform to one another, the first layer comprising a dielectric composite material having first and second surfaces, and the second layer comprising a conductive material contacting the first surface of the first layer, whereby the electrical reactance of the first layer is configured for the propagation of electromagnetic surface waves thereacross;

a first transducer on or adjacent the second surface of the first layer of the structural component at a first location, the first transducer being adapted to generate electromagnetic surface waves for carrying data and/or power across the first layer; and a second transducer on or adjacent the second surface of the first layer of the structural component at a second location spaced from the first location, the second transducer being adapted to receive electromagnetic surface waves from the first layer and to retrieve data and/or power from the received electromagnetic surface waves;

whereby the electromagnetic surface waves are transmitted from the first transducer to the second transducer by the first layer of the structural component, and wherein:

the dielectric composite material forming the first layer comprises reinforcement elements disposed in a matrix, and the first layer has a bulk region in which both the reinforcement elements and the matrix are present and a first skin region comprising a greater proportion of matrix to reinforcement elements than in the bulk region, the first skin region forming the first surface of the first layer.

In existing waveguide systems such as disclosed in US2013/0064311 and U.S. Pat. No. 7,307,589, the transmitting dual-layer substrate is applied to or carried by a rigid structure such as an item of furniture or a vehicle if required to be deployed in such a context. In contrast, the presently disclosed system enables the structure itself to form the waveguide. This is achieved by forming a structural component of a first layer comprising a dielectric composite material, which provides the mechanical properties required to give the structure the necessary rigidity and strength (i.e. acts as a structural material), and a second layer contacting and conforming to the first which is a conductor. In combination, the electrical properties of the two layers are such as to support the propagation of electromagnetic surface waves across the assembly. Dielectric media are able to support electrostatic fields with minimal heat dissipation, the ability of which is represented by the dielectric loss value (proportion of energy lost as heat) of a material.

Existing methodology for integrating power and communications into composite materials materials) uses conventional wires, optical fibres and interconnections. The presently disclosed system enables such components to be dispensed with thus simplifying the configuration and reducing the part count, the composite material itself providing the necessary data and/or power connections whilst also providing structural support. For example, having the ability to transmit electromagnetic waves across solid material in this way can be used to pass data from a transmitter to a receiver. Using surface wave forms such as Zenneck surface waves and other trapped surface waves, data can be passed at a very high speed over a given distance. Trapping the surface wave is critical to be able to transfer data successfully. A trapped wave occurs when the angle of the incidence from the dielectric medium to the air-dielectric interface is greater than the critical angle total internal reflection will occur but will decay exponentially. A surface wave requires an interface between two media as it exists partially in both. Therefore if the electric field is unable to penetrate into one of the media, a surface wave cannot propagate.

The composite dielectric material may be configured such that the EM surface waves propagate across the second surface of the first layer (i.e. along the composite/air interface), or along an interface inside the dielectric composite as discussed below.

The presently disclosed system provides several additional advantages. Since the surface waves are constrained to the defined surface they will follow its contours and as such the transducers need not be in a line-of-sight arrangement. Compared to wireless systems, the disclosed arrangement is secure since the waves cannot be intercepted remotely from the surface: the system is "non-leaky" as the surface waves will not migrate significantly from the waveguide and hence are more difficult to eavesdrop (as compared with other EM wave types for which the risk of migration off the waveguide is higher). The surface waves are transmitted with low power dissipation hence the system is efficient. The waves will be transmitted around any breaks in the structure, e.g. holes or cracks and as such will not be rendered inoperable by single point breaks (as wires are vulnerable to), which effectively provides built in redundancy. The system is environmentally resilient and readily incorporated into existing structural designs.

The first and second transducers are arranged to generate/receive EM waves on the surface of the dielectric composite material which is away from the conductive material. It should be noted that the transducers need not be in contact with the surface but may in practice be spaced away from the dielectric material by a distance which depends on the transducer's power, e.g. up to several millimeters away. In addition only those components of the transducer which are required to launch/receive the EM waves need be located on the dielectric side of the multilayer structure. Other components could if desired be located on the conductive side with the necessary electrical connections made through the multiple layers.

It has been found that placing the second, conductive material layer against a resin-rich surface of the composite material (such as will be provided by the above-mentioned first skin region of the first layer) produces particularly good results in terms of the ability of the multilayer structure to propagate EM surface waves, especially where the dielectric composite material comprises reinforcement elements which are electrically conductive, such as carbon fibre. By "resin rich" it is meant that the surface portion of the first layer (i.e. the skin region) has a composition with a greater ratio of matrix to reinforcement elements as compared with that in the bulk region of the layer. Such a skin region may be provided on the first surface only, or also on the second surface of the first layer. Such skin regions can be formed by appropriate processing of the composite material. For example, when a composite material of the sort described is cured, often one surface of the finished material will have a greater proportion of matrix to reinforcement elements than the other, i.e. a skin region will be formed on one side. This effect is due to gravity causing the matrix material to flow in one direction whilst the matrix material is heated above its glass transition temperature during curing. However, alternative processing techniques may be used in which a skin region is also formed on the second surface.

Without wishing to be tied to theory, there are a number of mechanisms which may be behind the beneficial effects associated with providing a resin rich skin region as the first surface of the layer. Firstly the resin rich surface may be enhancing the dielectric quality of the composite locally to the conductive layer. The EM surface waves may be bound to (and propagated by) the interface between the resin-rich "skin" and the bulk region of the composite. The electrical properties of both the skin region and the bulk composite are believed to affect the distance the wave can travel (which is proportional to the amount of energy used by the transducers). Secondly, the resin rich surface is typically relatively smooth (i.e. following the contour of the layer as a whole, even at a relatively small scale) compared to the opposite surface where reinforcing elements may protrude to a degree and improves the adhesion of the conductive material to the composite, reducing the likelihood of flaws or gaps in the conductive layer.

Thirdly, the process of applying the conductive material to the opposite surface where the reinforcement elements are relatively exposed may introduce flaws to the reinforcement elements leading to damage to the material and potential breaks in the conductive layer.

Within this specification, composite materials are defined as being engineering materials made from two or more components that work together to exceed the performance of one. One component is often a strong fibre such as glass, quartz, Kevlar® or carbon fibre that gives the composite its tensile strength, while another component (called a matrix) is often a resin such as polyester or epoxy that binds the fibres together and generally renders the material stiff and rigid. Some composites use an particulate or aggregate instead of, or in addition to, fibres. Carbon Fibre Reinforced Polymer (CFRP) is an extremely strong and light fibre-reinforced polymer which contains carbon fibres. The binding polymer is often a thermoset resin such as epoxy, but other thermoset or thermoplastic polymers, such as polyester, vinyl ester or nylon, are sometimes used. The composite may contain other fibres, such as aramid e.g. Kevlar, Twaron, aluminium, or glass fibres, as well as carbon fibre.

The electrical properties of the dielectric composite material, such as its relative permittivity, and hence the electrical reactance of the first layer, will depend on a number of factors, including: the materials selected for the reinforcement elements and the matrix; any coating (e.g. sizing) provided on the reinforcement elements; and the arrangement of the reinforcement elements in the matrix. All of these can be adjusted to achieve the desired electrical properties of the composite layer. The electrical permittivity of the composite can be measured using a variety of known methods, including: resonant cavity perturbation techniques, free-space techniques and more preferably waveguide/transmission line methods. Suitable apparatus and associated software for performing the measurements are available from Agilent Technologies, Inc., for example. Waveguide methods presume a homogeneous sample is used and will not provide information concerning the individual layers in a multi-layer material, however this information is not normally required. It is often more important to determine the properties of the matrix material itself, in relation to the properties of the 'resin rich' surface of the composite (discussed below), and this can be done using a specially prepared sample of matrix material. It should be noted that certain composites will have directional effects, where dielectric properties will differ dependent on orientation (due to reinforcement orientation), and may also comprise internal regions of differing properties. This should be considered when making measurements. Specific filler materials added to the matrix will change the permittivity, for instance nano-scale metal oxide fillers. Small additions will lower the permittivity, whilst larger quantities will raise it. Permittivity measurements should be carried out based upon the frequency range of the EM surface wave used. As taught by US2013/0064311, the surface reactance of the surface or interface along which the surface waves are to propagate is preferably arranged to lie in the region of 50 to 1000 ohms in order to support EM surface wave transmission, although reactances outside of that range may also be operative. US2013/0064311 discloses formulae for calculating the surface reactance of a dual layer structure of dielectric and conductive material based on their electrical properties and geometry.

The dielectric composite material comprises reinforcement elements disposed in a matrix, the reinforcement elements preferably being fibres and/or particulates or other filler materials. In advantageous examples, the reinforcement elements comprise any of carbon, glass, quartz, an aramid such as Kevlar™ or Twaron™, metal, cotton, hemp, flax or other natural material, each preferably in the form of fibres. The matrix preferably comprises a polymeric material, such as a thermoset polymer or resin, or a thermoplastic. For example, the polymeric material may comprise epoxy resin, polyester, PEEK, vinyl ester or nylon. In an especially preferred embodiment, the dielectric composite material comprises a carbon fibre reinforced polymer, and preferably the polymer comprises a thermoset resin, most preferably epoxy resin. Such composites have been found to produce particularly good results.

The reinforcement elements may be arranged in the composite in various ways depending on the mechanical properties required of the layer, and this will also have an impact on its electrical properties. Preferably, the reinforcement elements are fibres and are arranged in at least two different orientations within the first layer. This provides the composite with tensile strength in more than one direction. Preferably the at least two directions are substantially orthogonal. Advantageously, the fibres are interwoven with one another (preferably in substantially orthogonal directions) to form a mat structure, preferably in a twill weave, most preferably in a 2×2 twill weave.

In other cases, the fibres may be unidirectional. In this case, the first layer preferably comprises a plurality of unidirectional sublayers, the fibres within each sublayer being orientated in parallel to one another to define the fibre direction of the sublayer and the fibre direction of at least two of the plurality of sublayers being different, most preferably orthogonal. Multiple plies of such layers can be laminated together in different directions to form the first layer.

The first layer may also be formed of a plurality of sublayers where the composition of the composite varies between sublayers (i.e. of at least two of the sublayers being different, preferably in terms of the composition of the reinforcement elements and/or of the matrix). For example, one sublayer could comprise carbon fibre reinforcement elements and another could comprise glass fibre or Kevlar fibre reinforcement elements. Alternatively the weave structure could be different from one sublayer to the next.

As mentioned above, a matrix-rich first skin region is provided which forms the first surface of the first layer. In some preferred embodiments, this first surface is matrix-rich (or "resin-rich") compared to the second surface of the first layer, whether this is formed by the bulk region or a second skin region of the composite. If a second skin region is provided, this will have a greater proportion of matrix to reinforcement elements than in the bulk region, but this may or may not be the same as the proportion in the first skin region. In particularly preferred embodiments, the first and/or second skin region comprises nearly 100% matrix and the reinforcement elements are substantially or completely absent, i.e. a "skin" layer comprising only matrix material may exist on one or both sides. A skin region of this sort will by definition have a thickness greater than a mere coating of matrix material as may cover the outermost reinforcement elements of the bulk region should this form the second surface of the first layer. Such a coating would tend to conform to the contours of the reinforcement elements whereas a skin region will generally "fill in" such contours resulting in a smoother surface. Preferably, the first skin region has a thickness of between 5% and 10% of the thickness of the first layer. Relative to the reinforcement elements, the first skin region preferably has a thickness greater than the mean (average) thickness of the reinforcement elements (e.g. the width or diameter of the element taken across a cross-section of the element perpendicular to its long direction, where the element is elongate as in the case of a fibre type element for instance). More preferably the thickness of the first skin region is at least twice this mean dimension of the reinforcement elements, still preferably at least 10 times the mean dimension. If a second skin region is provided, its thickness may be the same or different from that of the first skin region but is also preferably in the above range.

The conductive layer could be a standalone layer of conductive material affixed or placed in contact with the dielectric composite material, such as a metallic foil on which the composite is placed. Preferably, however, the second layer is a coating carried by the first surface of the first layer, advantageously applied by spraying, thermal spraying (e.g. high velocity oxy-fuel coating (HVOF) spraying or flame spraying), cold spraying, deposition, rolling, extrusion or another coating process.

The conductive material may be applied directly to the composite surface as formed, but in other examples a surface treatment may be applied to enhance retention of the material. For example, an adhesive, bonding or primer substance may be applied between the first and second layers for enhancing retention of the second layer to the first layer. Alternatively of in addition, the first surface of the first layer is a treated surface, preferably a textured surface such as a sandblasted surface, for enhancing retention of the second layer to the first layer.

The second layer could comprise any electrically conductive material but preferably comprises a metal or alloy, advantageously aluminium, copper, gold, or a Nickel-Iron alloy such as Fe—Ni36, for example INVAR™, which is an alloy with low coefficient of thermal expansion and is useful for composite applications. In a particularly preferred embodiment where the dielectric composite material comprises woven carbon fibres in an epoxy matrix, the second layer comprises aluminium.

The thickness of the first layer will depend on the structural requirements but will also have an effect on the electrical properties of the structure. In preferred embodiments, the first layer has a thickness in the range 0.5 mm to 100 mm, preferably 1 to 5 mm, more preferably around 1.5 mm. Where the first layer includes a resin-rich skin layer, in preferred examples this may have a thickness of between 5% and 10% of the thickness of the first layer. In one example, the skin layer may have a thickness of around 0.1 mm.

The second layer (of conductive material) advantageously has a thickness of at least 3 microns, preferably at least 50 microns, more preferably around 100 microns.

In some preferred examples, the second layer is provided across the whole area of the first layer. However this is not essential and in other cases it may be advantageous to provide the second layer discontinuously across the area of the first layer, the second layer being present along at least one continuous path between the first transducer and the second transducer. This may be desirable for example to reduce the amount of conductive material needed, or to simply retrofitting of the system to an existing structure (discussed below), or for cosmetic reasons, e.g. the conductive material could be applied according to a logo design or other pattern.

Also, the system may further comprise one or more additional transducers adapted for generation and/or reception of electromagnetic surface waves across the first layer of the structural component, in which case it may be advantageous to provide the second layer along a plurality of continuous paths each of which links at least two of the transducers, and wherein preferably at least two of the paths do not contact one another. In this way different electromagnetic waves could be transmitted between different transducers without interference.

More generally, in any embodiment the system may further comprise one or more additional transducers adapted for generation and/or reception of electromagnetic surface waves across the first layer of the structural component.

Where several of the transducers are positioned on the same continuous conductive path (e.g. as will be the case where the second layer covers the whole area of the first layer), data carried by the EM surface wave may include an address (i.e. identification) of the transducer for which it is intended, as in conventional wired network systems. Alternatively or in addition, at least some of the transducers may be adapted to transmit and/or receive electromagnetic waves of different frequencies from one another to avoid interference.

The transducers preferably form parts of units having components for processing data and converting to/from appropriate EM waveforms carrying the data, or for converting power to/from an EM wave. Exemplary implementations include those described in US2013/0064311. Preferably, at least one of the first and second transducers forms part of a device such as a sensor unit, an actuator unit, a communications device such as a telephone, a computer, a media player, a television, etc. At least one of the first and second transducers may also preferably form part of a controller adapted to control the device(s).

The transducers can take various forms including those disclosed in US2013/0064311. In a preferred embodiment, the first and/or second transducer comprises a waveguide defined by spaced opposing conductive surfaces and a signal generator adapted to supply a signal across the conductive surfaces to thereby generate an electromagnetic wave within the waveguide or a signal receiver adapted to detect a signal arriving within the waveguide. In another example, the first and/or second transducer comprises an antenna, preferably a patch antenna, monopole antenna or dipole antenna.

As noted above, the transducers need not be located on the first layer and could be spaced from its second surface e.g. by several millimeters, but preferably the transducers are affixed to the structural component. In some preferred implementations, the first and/or second transducer may be integrated into the first layer of the structural component. For example, the transducer could be co-cured into matrix, or it could be mechanically connected to the layer (e.g. by bolts, rivets etc.) or it could be adhesively bonded onto a laminate layer. In a particularly preferred example, the first and/or second transducer could be printed onto the second surface of the first layer, for example using techniques for printing antennas as disclosed in "Instant Inkjet Circuits: Lab-based Inkjet Printing to Support Rapid Prototyping of UbiComp Devices" by Yoshihiro Kawahara et al, UbiComp'13, 2013 Zurich, or in "Integrated Sensor Arrays based on PiezoPaint™ for SHM Applications" by Karl Elkjaer et al, Annual Conference of the Prognostics and Health Management Society, 2013.

In an advantageous development, the composite structure may also be used to support one or more fuel cells for generating power which can be utilised by the transducers. The incorporation of fuel cells into composite materials was disclosed in our International patent publication no. WO2007/036705. Hence, preferably, the first layer forms part of a composite laminate structure having a fuel cell incorporated therewithin, the composite laminate structure further comprising a core material within which the fuel cell is embedded, the fuel cell comprising an electrolytic membrane having first and second faces, and first and second electrodes disposed adjacent to the respective faces of the electrolytic membrane, the first and second electrodes being connectable to an electric circuit, wherein the core material provides support to the fuel cell embedded therein and fluid communication through the core material, to enable the passage of one or more fluids to the first and second electrodes. Preferably, the electric circuit includes the first and/or second transducer.

As already discussed the first layer of composite material provides structural support to the component and so preferably the first layer is self-supporting, e.g. rigid, so as to maintain the shape of the structural component. The system is particularly well suited to scenarios in which the first layer of the structural component is non-planar, since the transmitted surface waves will follow the contour of the material.

The disclosed system can be employed in many different applications. In particularly preferred examples, the structural component is at least part of a wall of a vehicle, aircraft, wing, sail, ship or building, the first layer of the structural component preferably forming the outer skin of the vehicle, aircraft, ship or building, the second layer being arranged on the inside. For example, certain types of vehicle such as Formula 1 cars and some aircraft are already based on a structure formed as composite material which can be utilised as the first layer in the disclosed system. The system may be retrofitted to an existing composite structure such as these by applying a suitable conductive material to the surface of the composite material to form the required second layer. As previously discussed, the conductive material need not be applied to the whole structure but only so as to form continuous paths between transducers provided to the structure.

The present invention therefore also provides a vehicle, aircraft, wing, sail, ship or building comprising a system as described above, wherein the structural component is a structural component of the vehicle, aircraft, wing, sail, ship or building.

Also provided is a network comprising: a system as described above, a controller of which the first transducer forms part and at least one device of which the second transducer forms part, wherein the controller is adapted to generate and output instruction data addressed to one or more of the at least one device, the electromagnetic surface waves generated by the first transducer carrying the instruction data, and the at least one device being adapted to retrieve the instruction data from the electromagnetic surface waves received by the second transducer and to react in accordance with the instruction data. In particularly preferred embodiments the network is a secure communications network.

In some cases the flow of data may be one-way, i.e. from the controller to the device(s) but in many cases two-way data transfer may be desirable, e.g. to provide feedback information from the device(s) to the controllers. Hence preferably, the at least one device is further adapted to generate and output information data, the second transducer being further adapted to generate electromagnetic surface waves carrying the information data, the first transducer being adapted to receive the electromagnetic surface waves and the controller being further adapted to retrieve the information data.

The present invention also provides a method of manufacturing a system for transmitting data and/or power across a structural component, the method comprising:

providing a structural component formed of first and second layers which conform to one another, the first layer comprising a dielectric composite material having first and second surfaces, and the second layer comprising a conductive material contacting the first surface of the first layer, whereby the electrical reactance of the first layer is configured for the propagation of electromagnetic surface waves thereacross;

disposing a first transducer on or adjacent the second surface of the first layer of the structural component at a first location, the first transducer being adapted to generate electromagnetic surface waves for carrying data and/or power across the first layer; and disposing a second transducer on or adjacent the second surface of the first layer of the structural component at a second location spaced from the first location, the second transducer being adapted to receive electromagnetic surface waves from the first layer and to retrieve data and/or power from the received electromagnetic surface waves;

such that the electromagnetic surface waves from the first transducer are transmitted to the second transducer by the first layer of the structural component and wherein:

the dielectric composite material forming the first layer comprises reinforcement elements disposed in a matrix, and the first layer has a bulk region in which both the reinforcement elements and the matrix are present and a first skin region comprising a greater proportion of matrix to reinforcement elements than in the bulk region, the first skin region forming the first surface of the first layer.

Preferably, providing the structural component comprises manufacturing a dielectric composite material to form the first layer by disposing the reinforcement elements in the matrix and curing the matrix according to the required shape of the structural component.

Advantageously, providing the structural component comprises applying the conductive material to a surface of the dielectric composite material to form the second layer. In preferred examples, the surface of the dielectric composite material is treated prior to application of the conductive material to enhance adhesion thereof, preferably by texturing or the application of an adhesive coating or binder, most preferably by sandblasting. The conductive material may be applied for example by spraying, thermal spraying (e.g. High velocity oxy-fuel coating (HVOF) spraying or flame spraying), cold spraying, deposition, rolling, extrusion or another coating process.

As discussed above the conductive material is applied to a matrix (resin) rich surface of the dielectric composite material, formed by the first skin region of the composite, which contains a greater proportion of matrix to reinforcement elements than that of the bulk composite. Preferably, the first surface of the first layer, formed by the first skin region, is matrix-rich compared to the second surface of the second surface of the first layer, which may be formed by the bulk region or could have a second skin region. Most preferably the first and/or second skin regions contain resin only.

The method need not include manufacture of the composite material itself since the system may be retrofitted to a structure which includes the dielectric composite material forming the first layer by applying the conductive material to a surface of the dielectric composite material in the structure, the structure preferably being at least a part of a vehicle, aircraft, wing, sail, ship or building.

The method can be adapted to provide the system with any of the features discussed above.

Examples of systems and methods in accordance with the present invention will now be described with reference to the accompanying drawings in which:

FIG. 3 shows (a) an example of a portion of a dielectric composite material which may be used in the first embodiment, and (b) the dielectric material coated with a conductive layer as may be used in the first embodiment;

Figure 1A:
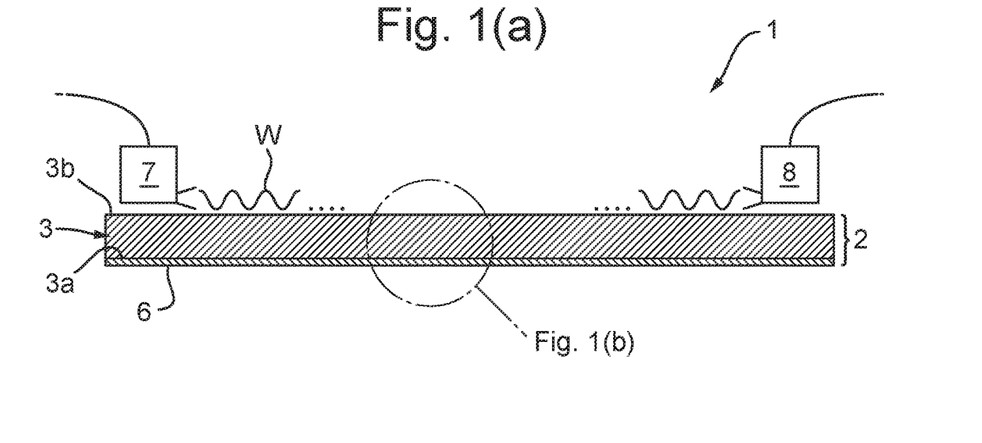
FIG. 1(a) shows a system according to a first embodiment, FIG. 1(b) showing an enlarged detail of the structural component of the system.
Figure 1B:
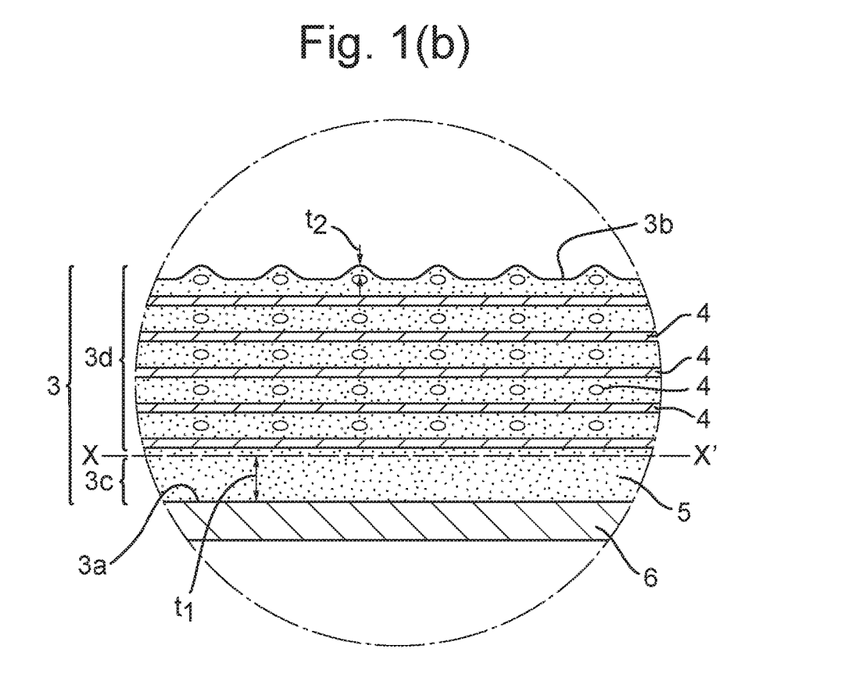

A first embodiment of a system 1 for transmitting data and/or power across a structural component 2 is shown in FIG. 1. The structural component 2 comprises a first layer 3 of a dielectric composite material and a second layer 6 of a conductive material. The two layers conform to one another such that both follow the same contours: in this example, for clarity the structural component 2 is depicted as planar but this will typically not be the case. For example, the structural component may form part of a wall, wing, sail, aircraft, vehicle etc., and may therefore be curved or follow one or more corners, or may be of a more complex shape. The conductive layer 6 is preferably applied to the composite layer 3 as is the case here, e.g. by spraying or another coating method.

In combination, the electrical properties of the dielectric composite layer 3 and the conductive layer 6 are selected such that the assembly will support the propagation of EM surface waves across the conductive layer 3 as described in US2013/0064311. Thus, the surface reactance of the interface supporting the EM wave propagation is preferably between 50 and 1000 Ohms. FIG. 1 depicts the upper surface 3b of composite layer 3 (i.e. the opposite surface from that carrying the conductive material 6) as forming the interface along which the EM wave propagates, as may be the case in some implementations. In other cases, the EM wave may be propagated along an interface internal to the composite 3 as will be described further below.

A first transducer 7 and a second transducer 8 are disposed on or near the surface 3b of the composite material. The first transducer 7 is configured to generate and output EM waves W carrying data and/or power. The second transducer 8 is configured to receive the waves W having been transmitted by the structural component 2 and retrieve the carried data and/or power. The transducers 7, 8 may be of any of the forms disclosed in US2013/0064311 or may comprise antennas such as monopole antennas, dipole antennas etc. The transducers need not be in contact with surface 3b but should preferably be disposed within 10 mm, preferably within 5 mm of its surface.

FIG. 1(b) shows an enlarged portion of the structural component 2 according to a preferred example. The composite layer 3 comprises reinforcement elements 4, here in the form of fibres, disposed in a matrix or binder 5. In this example the fibres include orthogonally arranged fibres which are interwoven to form a mat structure of which a cross section is shown. During manufacture, the material is heated to cause the matrix 5 (which is typically polymeric) to flow and encapsulate the fibres 4, leading to the formation of a first skin region 3c which comprises matrix only, or at least a greater proportion of matrix to reinforcement fibres than the rest of the composite, distinct from the bulk composite in region 3d. (Where the reinforcement elements are fibres the skin region will typically comprise only matrix material whereas if the elements are particulates, some may be present in the skin region but at a lower proportion than in the bulk region). Hence surface 3a of the composite 3 may be described as a matrix-rich (or resin-rich) surface of the composite. It is preferable to apply the conductive layer 6 to this surface rather than the opposite surface 3b. As shown in FIG. 1(b) in the present example this surface 3b is formed by the bulk region 3d of the layer 3 and hence is less smooth than the resin rich surface 3a and as such may be damaged by the coating process. Applying the conductive material to the resin rich surface 3a also improves the adhesion of the conductive material due to the relatively smooth nature of this surface.

In embodiments having a matrix skin region 3c, the EM surface waves may be propagated by the interface between the matrix region 3c and the region 3d of bulk composite. As such the thickness $t_1$ of the skin region 3c may be adjusted in order to obtain the desired electrical properties and this can be achieved via appropriate adjustment to the composition of the composite and the parameters under which it is cured. In preferred examples, the thickness $t_1$ of the skin region may be in the range of 5% to 10% of the thickness of the composite layer 3. For example in the case of a 1.5 mm layer of woven carbon fibre/epoxy material, the skin layer may have a thickness of around 0.1 mm. The thickness of the skin layer 3c is preferably greater than the mean (average) thickness of the reinforcement elements 3 (e.g. the width or diameter of the element taken across a cross-section of the element perpendicular to its long direction, where the element is elongate as in the case of a fibre type element for instance). More preferably the thickness of the first skin region is at least twice this mean dimension of the reinforcement elements, still preferably at least 10 times the mean dimension. For instance, in the above example, the mean thickness of the reinforcement fibres 4 is preferably between 0.25 mm and 1 mm (latter preferably a bi-directional weave). More generally, the reinforcement elements may typically have dimensions of the order of nanometers to millimeters. For example, suitable nanofibres may have at least one dimension which is 100 nm or less. An example of one nanofibre used in composites is polysulfone nanofibre with an average diameter of 230 nm. However, the reinforcement elements could have dimensions of up to 5 mm in some examples. Reinforcement elements may also include nanofillers such as carbon nanofibres and carbon nanotubes and they will typically fall into the same dimension range. Where present, the skin thickness $t_1$ will be greater than the thickness $t_2$ of any matrix material coating the fibres 4 on the opposite surface of the composite 3, assuming this surface is formed by the bulk region 3d.

In other cases, a skin region may be formed on both surfaces of the first layer. Like the first skin region 3c, the second skin region (not shown) forming the second surface 3b of the layer will have a greater proportion of matrix to reinforcement element than the bulk region 3d of the layer, but this proportion may be the same as or different from that of the first skin region 3c.

Many different techniques exist for manufacturing structural composites, and each of these techniques can be modified to produce the composite component (first layer 3) in embodiments of the present invention, so as to provide one or more skin regions (such as 3c) and hence resin-rich surfaces. A non-exhaustive list of suitable manufacturing techniques and applicable modifications is provided below:

Open Moulding—a resin rich surface layer normally exists on the composite surface formed in contact with the mould, where a coating of resin material can be laid down prior to layup if not enough resin is caused to form a resin rich surface during normal processing. A resin rich surface layer can be formed on a rough or dry non-mould surface by adding additional top coats of resin either by brush (or other) application or as a film adhesive layer of matrix material.

Vacuum Infusion—a resin rich surface layer normally exists on the composite surface formed in contact with the mould. Additional resin can be applied after the composite has been removed from the mould either by a film adhesive, casting directly on to any composite surface, or by other known methods (e.g. brush, spray, etc). This method of fabrication is preferable due to the well consolidated, low air content composite constructions that can be produced, even at high reinforcement levels.

Resin Transfer Moulding—a resin rich surface will usually form on the composite surface in contact with the lower mould. Control of the resin content and regular mould turning during cure can allow formation of uniform resin rich surfaces, if required, with some dependence also on the finish of the mould itself. Additional deposited layers of resin can be provided using films, spraying, brushing and so on.

Vacuum Bag Moulding of Prepregs—the bleeder fabric used to mop up additional resin during processing can be modified to lower absorption and leave additional resin on the surface of the processed laminate. Film adhesives can be placed on any dry or rough side, where required, and any composite surface can be laid up with additional resin by previously mentioned methods.

Press Moulding of Prepregs—Mould rotation or spinning can be used to modify the resin rich surfaces, similar to Resin Transfer Moulding.

Compression Moulding of Sheet Moulding Compound (SMC)—SMC is similar to pre-preg, but is composed of different materials, usually polyester and chopped glass fibres. Processing is similar to pre-pregs, but the moulds for SMC are designed to allow air to escape and matrix/resin material to flow extensively, which allows formation of resin rich surfaces on all composite surfaces.

Pultrusion—the amount of resin material impregnated into the fibres can be adjusted to provide a saturated outer surface layer, providing resin rich surfaces where required.

Filament Winding—additional resin can be added at the final winding stage to form a resin rich surface. Portable filament winders have recently been used to strengthen bridge piers. The addition of resin/matrix material will provide greater protection from UV but will also enhance the surface finish allowing stress gauges to be embedded. These could be used in conjunction with surface waves so the sensors act as a collective over the entire structure.

Centrifugal Casting—additional resin can be added to ensure that enough resin is distributed by the centrifugal forces to the outer surfaces of the composite to form resin rich surfaces.

Continuous Sheeting—adding a film adhesive compatible with the matrix either side of the sheet will provide a smooth shiny surface that can be post bonded to other materials.

In all of the above cases, it is highly preferable that additional resins or films should match the matrix material of the bulk region to ensure that the required structural properties are achieved, although in some cases it may be possible to tailor the resin rich surface(s) with materials that are specially adapted to improve transmission of surface waves. It should be noted that additional resin can be added at various times during the manufacturing processes, including pre-cure, during some curing processes and post-cure, with possible additional curing steps of added material if required, or left relatively uncured if the added resin is to be used in metal layer bonding processes. Extra resin can generally be brushed, sprayed, applied as a film or deposited using known methods to most composite constructions.

In a particularly preferred example, the reinforcement elements 4 are woven carbon fibre, the matrix 5 is an epoxy resin and the conductive layer 6 is a metal or alloy, preferably aluminium. Thus, in an exemplary case, layer 3 is a woven carbon fibre, epoxy-impregnated laminate cured using a multi-Daylight press, with an aluminium coating 6. The laminate can be coated with aluminium to a given thickness on one face using a thermal spray process, such as HVOF, flame spray, cold spray or any number of other coating processes. This composite is a woven carbon fibre matt that has been impregnated with epoxy.

WORKED EXAMPLE

The structural component 2 of the system shown in FIG. 1 may be produced in the following way. A carbon fibre substrate was produced using a pre-preg supplied by Amber Composites/Tencate Advanced Composites. This consisted of a carbon fibre fabric HS0838 in a 2×2 twill weave with the following properties:

Carbon Fibre 205 g/m2 with a twill weave of 2/2 using a 6 inch core diameter width of 1000 mm; fibre thickness can be in the range 0.25 mm to 1 mm (latter bi-directional weave)

Figure 2:
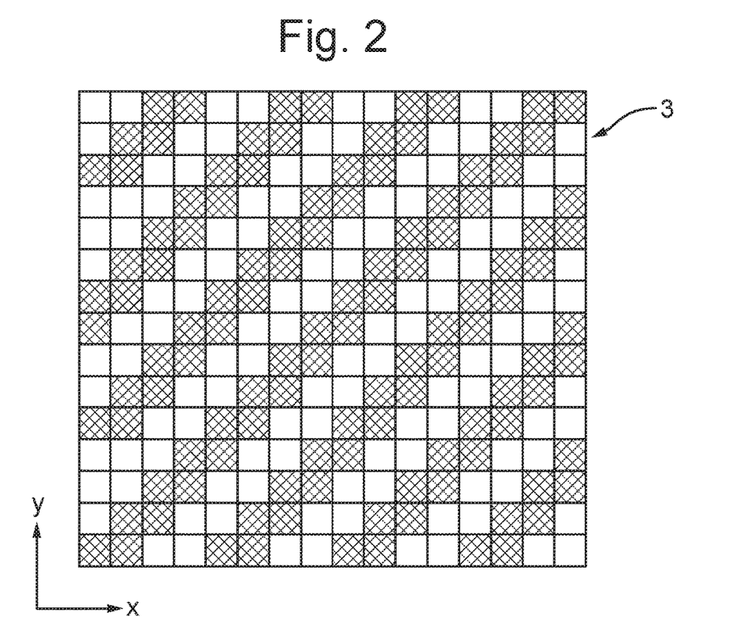
FIG. 2 shows an exemplary weave pattern of a dielectric composite material which may be used in the first embodiment.

Warp TR30S T Strength of 4410 MPa Modulus 235 GPa tow 3K 1.20% size with no twist Weft TR30S T 4410 Strength MPa Modulus 235 GPa tow 3K 1.20% size with no twist This carbon fibre fabric provides excellent cosmetic appearance, is highly formable and stronger than plain weave, so highly suited to structural applications. FIG. 2 shows the weave pattern of the carbon fibre pre-pregs used to make the laminate 3 in this example. This is a 2×2 twill weave, where two warp threads cross every two weft threads to give the characteristic pattern shown. This provides a pre-preg with excellent drapability, useful for producing a wide variety of structural shapes.

A mid-temperature curing modified epoxy E722 pre-preg was used as the pre-preg resin in conjunction with the carbon fibre fabric to produce a finished laminate. E722 cures at 120° C. and is designed for structural applications in the motor and marine industries. E722 is also suitable for general aircraft fittings and sports equipment. It is supplied already impregnated onto the fabric.

Figure 3A:
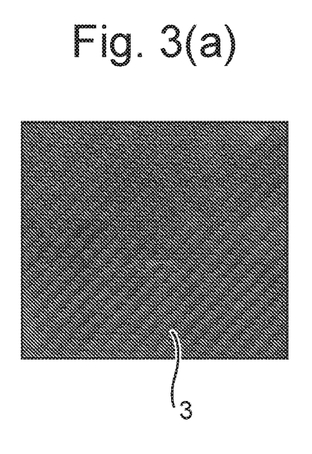
Figure 3B:
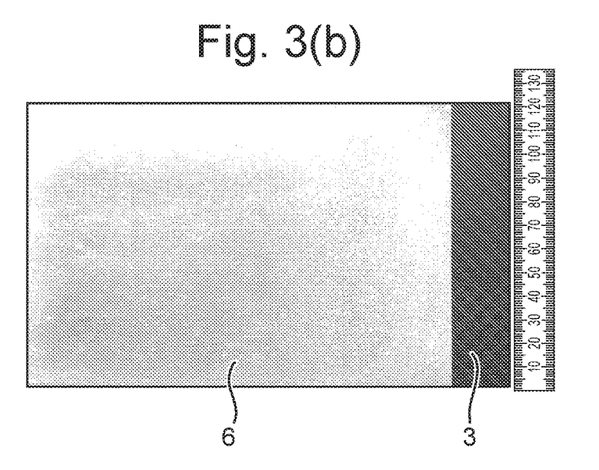

These are the typical properties of the pre-preg system.
Excellent drapability
Good surface finish
Medium tack level easily laminated
Low volatiles
Can be autoclaved, Vacuum bagged and press curable
Typical resin properties:
Density 1.21 g/cm3 at 23 Centigrade
Glass transition temperature (Tg) after one hour 120 Centigrade
Typical laminate properties (after curing):
Tensile Strength (Warp) 595 MPa
Tensile Modulus (Warp) 56.1 GPa
Tensile Strength (Weft) 580 MPa
Tensile Modulus (Weft) 52.4 GPA The laminate, of exemplary thickness 1.5 mm, was then coated with aluminium on the resin rich surface. This is usually the decorative (wale) surface that is shiny. The aluminium was applied using a flame spray technique, which is well known in the art, although various other coating methods can be used. Such a layer 6 can be laid directly upon the composite 3 or by using a suitable bond coat. The surface 3a of the composite may alternatively or in addition be treated, e.g. by sandblasting, to promote adhesion. Typical thickness is of the coating is 100 microns (0.1 mm). FIG. 3(a) shows the cured, uncoated composite laminate layer, and FIG. 3(b) shows a plate of the same material 3 which has been partially coated with conductive material 6.

The samples were tested using a system for receiving and transmitting high definition video signals, in accordance with US 2013/0064311 and as shown in FIG. 1, whereby signals were successfully transmitted across the samples.

A system according to the invention may consist of launch/receive transducers 7, 8 in contact with the composite substrate or held a short distance away (up to around 4 mm). Transducers can even be integrated into the substrate or even printed on it using known techniques.

Apart from the substrate fabrication technique shown, it is possible to use other composite construction methods, provided that the dielectric properties of the composite 3 and lay-up of the conductive layer 6 are suitable. The substrate can be a single solid laminate, can be split with limited gaps between which can still be jumped by the electromagnetic wave W, and can be drilled and machined without appreciably degrading the signal.

Figure 4:
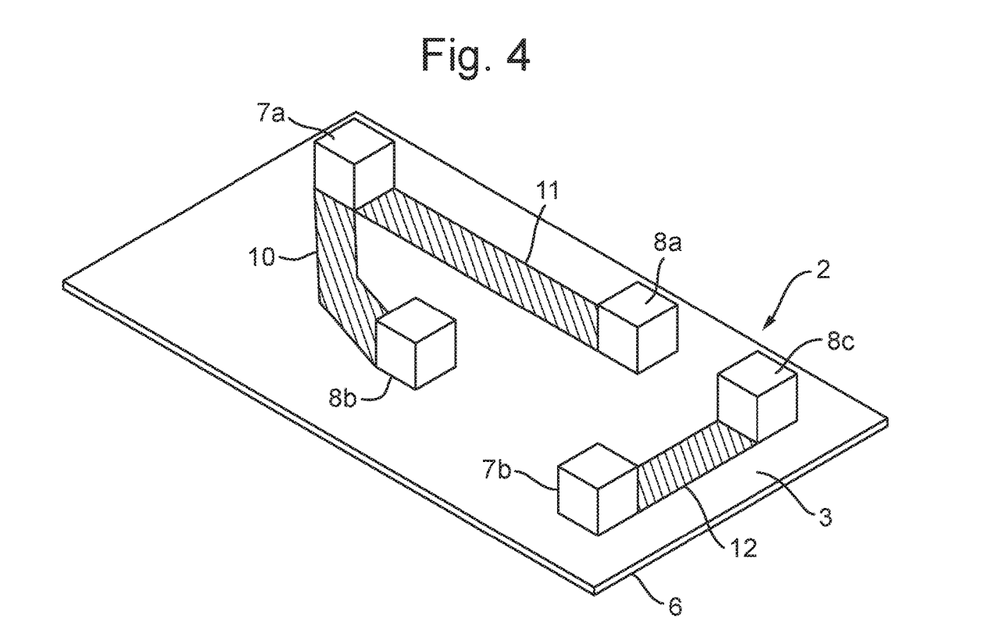
FIG. 4 shows a system according to a second embodiment.

FIG. 4 shows a second embodiment of a system utilising a structural component 2 as described in relation to the first embodiment, with a dielectric composite layer 3 and an underlying conductive layer 6 the presence of which is indicated schematically by the outline labelled 6. In practice whilst in some cases it will be preferred, the conductive layer 6 need not be provided over the whole area of the composite layer 3 and this is the case in the present example. In this case, the conductive material 6 is only provided in the areas labelled 10, 11 and 12. It should recalled that despite these areas being shown on the top surface of the composite 3 in reality the conductive material is on the underside. In this example, five transducers 7a, 7b, 8a, 8b, 8c are provided. Conductive paths 10 and 11 join transducer 7a to transducers 8a and 8b whilst separate conductive path 12 joins transducer 7b to transducer 8c. Thus, EM waves transmitted between transducers 7a, 8a and 8b will not interfere with those transmitted between transducers 7b and 8c because where the conductive material 6 is not present, the structural component 2 is unable to support the propagation of EM surface waves.

The various transducers typically form part of units such as devices and/or controllers. For example, transducer 7a may form part of a controller adapted to control two devices which comprise transducers 8a and 8b respectively. The devices may each comprise a sensor unit, an actuator unit, a processor, telephone, computer etc. The controller may, via transducer 7a, output EM waves carrying data signals which include control information or instructions for operation of the devices. Each instruction may include address information so that the devices can identify which device is the intended recipient, as is well known in networked systems. The transducers 8a and 8b receive the EM waves carrying the data and demodulate the received waves to retrieve the data as taught in US2013/0064311. The transducers 8a and 8b may also transmit data back to transducer 7a in the same manner. It should be appreciated that the communications system can be used to transmit various signal types unimpeded, and can be used for purposes of actuation and structural health monitoring, as well as purely a data waveguide.

Figure 5:
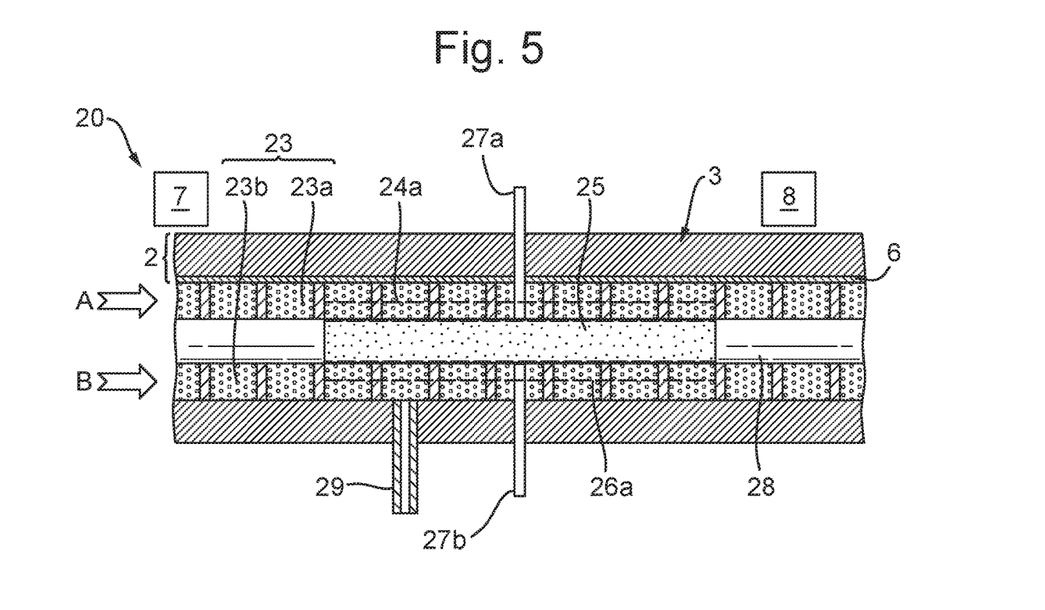
FIG. 5 shows a system according to a third embodiment.

FIG. 5 shows a third embodiment of a system which further comprises a fuel cell embedded in the structure which is configured to generate power which can be utilised by the transducers. WO2007/036705 discloses techniques for incorporating fuel cells inside composite laminate structures, utilising core materials such as honeycomb, foams or 3D open weave materials for fluid flow through the structure.

In the example shown, the structural component 2 already described above forms one of two skin layers which sandwich a core 23 which is divided into first and second core materials 23a and 23b. Thus the outermost layer of the structure comprises a dielectric composite layer 3 as previously described and a conductive layer 6 is provided on its interior surface. A fluid-impermeable interlayer 28 is situated at the interface between the two core materials. The first and second core materials 23a and 23b are here depicted as made of honeycomb, which has been perforated to enable flow of fluid between certain cells. However, it should be appreciated that any suitable core material having the (inherent or otherwise) ability to transfer fluid through it and support the composite structure could be employed.

A membrane electrode assembly (MEA) 25 is disposed at the interface between the two core materials 23a and 23b in a region to which the interlayer 28 does not extend, in this case an aperture in the interlayer 28. The interlayer 28 is considered part of the core 23 and as such, the MEA 25 is said to be embedded in the core 23. In this context, "embedded" means that the MEA is set into the core 23, as demonstrated by the examples described herein. Thus, the MEA is generally entirely surrounded by the core (i.e. that part of the structure between the skins 21), although the core may comprise two or more components. The MEA 25 comprises an electrolytic membrane 22, an anode 24 and a cathode 26 as shown in FIG. 3a. Current collectors 27a and 27b connect the anode 24 and cathode 26, respectively, to an electric circuit (not shown) which preferably includes at least one transducer as described above. In practice, it is convenient to provide current collectors 27a and 27b as wiring or conductive tracks on the interlayer 28, rather than pass them immediately through the core and skin materials as shown. However, if components which are to be powered by the fuel cell are disposed on or near the outside of the structure (for instance, on skin 21), it may be preferable to lead the current collector out directly, as shown, to reduce the amount of wiring required.

It will be appreciated that any known type of fuel cell, for example PEMFCs, DMFCs or SOFCs, may be incorporated into a composite structure in this way.

A first fluid A, usually a fuel such as hydrogen, is arranged to pass through the first core material 23a to arrive at the anode 24. This may be achieved, for example, by pumping the fluid through the material or applying pressure to the fluid source. Pressurised cylinders or containers can be used to store the fuel and/or reactant fluids (for example, hydrogen and oxygen respectively) remotely from the core material wherein pressure is controlled by a governor and the fluids are fed to the core material via inserts. Alternatively, the fuel fluid may be stored in this manner and an oxidant, air for example, obtained directly from the surrounding atmosphere. Further, the core material itself may form a storage structure such as a well for one or more of the fluids, which are maintained under pressure via the governor of an external fluid storage container, thus providing a better-regulated supply of fluid to the MEA (as opposed to directly connecting the external fuel fluid storage container to the channels supplying the MEA). There may be occasions where localised fluid storage is considered so that a MEA can be supplied with a discrete supply of fuel and/or reactant fluid. In this case, the fluid(s) could be stored within the composite structure itself and released to the MEA when needed, with no need for an external storage container. Any combination of these techniques could be employed to suit the application.

Similarly, a second fluid B, usually an oxidant or other such reactant such as a reducing agent, is transported through the second core material 23b to the cathode 26. Transport of the second fluid B may be effected using the same technique as for fluid A, or alternative means may be preferred. This may especially be the case where one fluid is a gas and the other a liquid.

The fluids A and B react at their respective electrodes, and an electric current is established in the circuit to which current collectors 27a, 27b are connected. The current collectors 27a, 27b may be provided in the form of mesh, wire or conductive tracks, either fixed, bonded or sprayed onto the interlayer 28. Complex patterns of conductive, semi-conductive or insulating tracks can be applied in two or three dimensions allowing multiple tasks to be performed.

A drain 29 may be provided to allow reaction products, such as water, to exit the structure. Depending on the core material selected, it may be necessary to provide a flow channel in the material to direct the water from the cathode 26 to the drain 29.

The core material(s) 23 may be honeycomb, foam, open knitted weave or any equivalent 3-D fabric that provides the necessary mechanical performance requirements demanded by the end-use application of the composite structure, and provides a fluid transfer mechanism via which gases and/or liquids may be delivered to the embedded fuel cell.

The invention claimed is:

1. A system for transmitting data and/or power across a structural component, comprising:
   a structural component formed of first and second layers which conform to one another, the first layer comprising a dielectric composite material having first and second surfaces, and the second layer comprising a conductive material contacting the first surface of the first layer, whereby the electrical reactance of the first layer is configured for the propagation of electromagnetic surface waves thereacross;
   a first transducer on or adjacent the second surface of the first layer of the structural component at a first location, the first transducer being adapted to generate electromagnetic surface waves for carrying data and/or power across the first layer; and
   a second transducer on or adjacent the second surface of the first layer of the structural component at a second location spaced from the first location, the second transducer being adapted to receive electromagnetic surface waves from the first layer and to retrieve data and/or power from the received electromagnetic surface waves;
   whereby the electromagnetic surface waves are transmitted from the first transducer to the second transducer by the first layer of the structural component, and wherein:
   the dielectric composite material forming the first layer comprises reinforcement elements disposed in a matrix, and the first layer has a bulk region in which both the reinforcement elements and the matrix are present and a first skin region comprising a greater proportion of matrix to reinforcement elements than in the bulk region, the first skin region forming the first surface of the first layer.

2. The system according to claim 1 wherein the reinforcement elements comprise any of carbon, glass, quartz, an aramid, metal, cotton, hemp, flax or other natural material.

3. The system according to claim 1, wherein the matrix comprises a polymeric material.

4. The system according to claim 1, wherein the dielectric composite material comprises a carbon fibre reinforced polymer.

5. The system according to claim 1, wherein the first surface of the first layer, formed by the first skin region, is matrix-rich compared to the second surface of the second surface of the first layer.

6. The system according to claim 1, wherein the second surface of the first layer is formed by the bulk region of the first layer.

7. The system according to claim 1, wherein the first layer further comprises a second skin region comprising a greater proportion of matrix to reinforcement elements than in the bulk region, the second skin region forming the second surface of the first layer.

8. The system according to claim 1, wherein the first and/or skin region comprises substantially 100% matrix and the reinforcement elements are substantially or completely absent.

9. The system according to claim 1, wherein the first skin region has a thickness of between 5% and 10% of the thickness of the first layer.

10. The system according to claim 1, wherein the first skin region has a thickness greater than the mean thickness of the reinforcement elements.

11. The system according to claim 1, wherein the second layer is a coating carried by the first surface of the first layer.

12. The system according to claim 1, comprising an adhesive, bonding or primer substance between the first and second layers for enhancing retention of the second layer to the first layer.

13. The system according to claim 1, wherein the second layer comprises a metal or alloy.

14. The system according to claim 1, wherein the first layer has a thickness in the range 0.5 mm to 100 mm.

15. The system according to claim 1, wherein the second layer is provided discontinuously across the area of the first layer, the second layer being present along at least one continuous path between the first transducer and the second transducer.

16. The system according to claim 15, further comprising one or more additional transducers adapted for generation and/or reception of electromagnetic surface waves across the first layer of the structural component, the second layer being provided along a plurality of continuous paths each of which links at least two of the transducers.

17. The system according to claim 1, further comprising one or more additional transducers adapted for generation and/or reception of electromagnetic surface waves across the first layer of the structural component.

18. The system according to claim 17, wherein at least some of the transducers are adapted to transmit and/or receive electromagnetic waves of different frequencies from one another.

19. The system according to claim 1, wherein the first layer forms part of a composite laminate structure having a fuel cell incorporated therewithin, the composite laminate structure further comprising a core material within which the fuel cell is embedded, the fuel cell comprising an electrolytic membrane having first and second faces, and first and second electrodes disposed adjacent to the respective faces of the electrolytic membrane, the first and second electrodes being connectable to an electric circuit, wherein the core material provides support to the fuel cell embedded therein and fluid communication through the core material, to enable the passage of one or more fluids to the first and second electrodes.

20. The system according to claim 1, wherein the first layer is self-supporting so as to maintain the shape of the structural component.

21. The system according to claim 1, wherein the first layer of the structural component is non-planar.

22. The system according to claim 1, wherein the structural component is at least part of a wall of a vehicle, aircraft, wing, sail, ship or building.

23. A vehicle, aircraft, wing, sail, ship or building comprising a system according to claim 1, wherein the structural component is a structural component of the vehicle, aircraft, wing, sail, ship or building.

24. A network comprising a system according to claim 1, a controller of which the first transducer forms part and at least one device of which the second transducer forms part, wherein the controller is adapted to generate and output instruction data addressed to one or more of the at least one device, the electromagnetic surface waves generated by the first transducer carrying the instruction data, and the at least one device being adapted to retrieve the instruction data from the electromagnetic surface waves received by the second transducer and to react in accordance with the instruction data.

25. A method of manufacturing a system for transmitting data and/or power across a structural component, the method comprising:

providing a structural component formed of first and second layers which conform to one another, the first layer comprising a dielectric composite material having first and second surfaces, and the second layer comprising a conductive material contacting the first surface of the first layer, whereby the electrical reactance of the first layer is configured for the propagation of electromagnetic surface waves thereacross;

disposing a first transducer on or adjacent the second surface of the first layer of the structural component at a first location, the first transducer being adapted to generate electromagnetic surface waves for carrying data and/or power across the first layer; and disposing a second transducer on or adjacent the second surface of the first layer of the structural component at a second location spaced from the first location, the second transducer being adapted to receive electromagnetic surface waves from the first layer and to retrieve data and/or power from the received electromagnetic surface waves;

such that the electromagnetic surface waves from the first transducer are transmitted to the second transducer by the first layer of the structural component, and wherein:

the dielectric composite material forming the first layer comprises reinforcement elements disposed in a matrix, and the first layer has a bulk region in which both the reinforcement elements and the matrix are present and a first skin region comprising a greater proportion of matrix to reinforcement elements than in the bulk region, the first skin region forming the first surface of the first layer.

26. The method according to claim 25, wherein providing the structural component comprises applying the conductive material to a surface of the dielectric composite material to form the second layer.

27. The method according to claim 25, wherein the first surface of the first layer, formed by the first skin region, is matrix-rich compared to the second surface of the second surface of the first layer.

28. The method according to claim 25, wherein the system is retrofitted to a structure which includes the dielectric composite material forming the first layer by applying the conductive material to a surface of the dielectric composite material in the structure.

* * * * *